US012789988B2

(12) United States Patent
Poscher et al.

(10) Patent No.: US 12,789,988 B2
(45) Date of Patent: Nov. 10, 2026

(54) METHOD OF AND AN UNMANNED AERIAL VEHICLE FOR ACTING UPON A RESTRICTION IN SERVICES FOR THE UAV, A UAV CONTROL SERVER AND A BASE STATION

(71) Applicant: Telefonaktiebolaget LM Ericsson (publ), Stockholm (SE)

(72) Inventors: Jens Poscher, Aachen (DE); Stefan Eichinger, Pulheim (DE); Ralph Detke, Herzogenrath (DE); Pedro Tercero, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 656 days.

(21) Appl. No.: 17/919,524

(22) PCT Filed: Apr. 17, 2020

(86) PCT No.: PCT/EP2020/060859
§ 371 (c)(1),
(2) Date: Oct. 17, 2022

(87) PCT Pub. No.: WO2021/209155
PCT Pub. Date: Oct. 21, 2021

(65) Prior Publication Data
US 2023/0081924 A1 Mar. 16, 2023

(51) Int. Cl.
*B64C 39/02* (2023.01)
*G08G 5/55* (2025.01)
(Continued)

(52) U.S. Cl.
CPC ............ *B64C 39/024* (2013.01); *G08G 5/55* (2025.01); *G08G 5/57* (2025.01); *H04W 36/24* (2013.01);
(Continued)

(58) Field of Classification Search
None
See application file for complete search history.

(56) References Cited

U.S. PATENT DOCUMENTS 9,491,635 B2 * 11/2016 Hyslop ................ H04W 16/14
9,537,561 B1 * 1/2017 Kotecha ................ H04W 8/00
(Continued)

FOREIGN PATENT DOCUMENTS

WO 2018203120 A1 11/2018
WO 2019029575 A1 2/2019

OTHER PUBLICATIONS

International Search Report and the Written Opinion of the International Searching Authority, issued in corresponding International Application No. PCT/EP2020/060859, dated Feb. 8, 2021, 15 pages.
(Continued)

*Primary Examiner* — Jonathan M Dager
(74) *Attorney, Agent, or Firm* — Rothwell, Figg, Ernst & Manbeck, P.C.

(57) ABSTRACT

A method of acting upon a restriction in services for an unmanned aerial vehicle, UAV, wherein the UAV is connected to a telecommunication network and wherein the UAV is allowed to utilize one or more services within the telecommunication network, the method comprising the steps of receiving, by the UAV, from a base station in the telecommunication network, access information for being served by the base station, determining, by the UAV, from the access information that at least one service of the one or more llowed services is restricted, determining, by the UAV, an action to be performed based on the at least one restricted service, the action eing at least one of a communication service modification of the UAV, and a physical action of the UAV, and finally performing, by the UAV, the action.

15 Claims, 6 Drawing Sheets

(51) Int. Cl.
*G08G 5/57* (2025.01)
*H04W 36/24* (2009.01)
*H04W 48/16* (2009.01)
*B64U 101/20* (2023.01)

(52) U.S. Cl.
CPC ......... *H04W 48/16* (2013.01); *B64U 2101/20* (2023.01)

(56) References Cited

U.S. PATENT DOCUMENTS

| | | | | |
|---|---|---|---|---|
| 9,567,074 | B2 * | 2/2017 | Levien | G08G 5/55 |
| 10,168,695 | B2 * | 1/2019 | Barnickel | G05D 1/0011 |
| 10,210,764 | B2 * | 2/2019 | Weisbrod | G01S 19/46 |
| 10,505,622 | B1 * | 12/2019 | Stein | B64D 17/80 |
| 10,945,171 | B2 * | 3/2021 | Kalathil | G05D 1/0022 |
| 10,952,113 | B2 * | 3/2021 | Mahkonen | H04B 7/18504 |
| 11,032,148 | B2 * | 6/2021 | Sweet, III | C23C 16/24 |
| 11,218,840 | B2 * | 1/2022 | Mahkonen | G08G 5/55 |
| 11,240,779 | B2 * | 2/2022 | Wang | H04W 56/003 |
| 11,330,599 | B2 * | 5/2022 | Zhang | H04B 7/185 |
| 11,405,925 | B2 * | 8/2022 | Schmidt | H04W 72/21 |
| 11,412,475 | B2 * | 8/2022 | Poscher | G01S 19/396 |
| 11,445,510 | B2 * | 9/2022 | Takács | G08G 5/26 |
| 11,485,493 | B2 * | 11/2022 | Mahkonen | G05D 1/0022 |
| 11,528,666 | B2 * | 12/2022 | Lekutai | H04W 52/14 |
| 11,620,912 | B2 * | 4/2023 | Poscher | G08G 5/26 701/3 |
| 11,817,001 | B2 * | 11/2023 | Mahkonen | G08G 5/25 |
| 12,035,185 | B2 * | 7/2024 | Berggren | H04W 36/08 |
| 12,366,451 | B2 * | 7/2025 | Yasini | G01C 21/16 |
| 2014/0172193 | A1 * | 6/2014 | Levien | G08G 5/55 701/2 |
| 2015/0254988 | A1 * | 9/2015 | Wang | G05D 1/106 701/3 |
| 2016/0205560 | A1 * | 7/2016 | Hyslop | H04W 16/14 455/454 |
| 2016/0330771 | A1 * | 11/2016 | Tan | H04B 7/18506 |
| 2017/0295069 | A1 * | 10/2017 | Sweet, III | C23C 16/24 |
| 2019/0012923 | A1 * | 1/2019 | Weisbrod | G01S 19/46 |
| 2019/0045406 | A1 * | 2/2019 | Kalathil | G05D 1/0022 |
| 2019/0306675 | A1 * | 10/2019 | Xue | G05D 1/101 |
| 2020/0007825 | A1 * | 1/2020 | Jeong | B64U 10/16 |
| 2020/0020236 | A1 * | 1/2020 | Zhou | G08G 5/26 |
| 2020/0036886 | A1 * | 1/2020 | Kim | G05D 1/0022 |
| 2020/0037397 | A1 * | 1/2020 | Sergeev | B64U 10/13 |
| 2020/0099441 | A1 * | 3/2020 | Stein | B64D 17/80 |
| 2020/0154426 | A1 * | 5/2020 | Takács | G08G 5/26 |
| 2020/0220612 | A1 * | 7/2020 | Thomas | H04B 7/18502 |
| 2020/0245174 | A1 * | 7/2020 | Lu | H04B 7/18506 |
| 2020/0245175 | A1 * | 7/2020 | Zhang | H04B 7/18504 |
| 2020/0252941 | A1 * | 8/2020 | Schmidt | H04B 7/185 |
| 2020/0372811 | A1 * | 11/2020 | Lindqvist | G05D 1/0022 |
| 2021/0116941 | A1 * | 4/2021 | Lee | B60L 53/12 |
| 2021/0165405 | A1 * | 6/2021 | Hong | G05D 1/0027 |
| 2021/0241635 | A1 * | 8/2021 | Tribou | B64U 10/16 |
| 2021/0287559 | A1 * | 9/2021 | Jeong | B64U 10/16 |
| 2022/0187851 | A1 * | 6/2022 | Poscher | G05D 1/0022 |
| 2022/0345453 | A1 * | 10/2022 | Van Duren | H04L 63/302 |
| 2023/0069579 | A1 * | 3/2023 | Al Tamimi | H04B 7/18504 |

OTHER PUBLICATIONS

Huawei et al. "UAS authorization considering association of the UAV and UAV controller" SA WG2 Meeting #136AH, Incheon, South Korea, Jan. 13-17, 2020, s2-2000682, 3 pages.

3GPP 3rd Generation Partnership Project; Technical Specification Group Services and System Aspects; Unmanned Aerial System (UAS) support in 3GPP; Stage 1; Release í7, 3GPP TS 22,125 V17.1.0, (Dec. 2019), 16 pages.

* cited by examiner

METHOD OF AND AN UNMANNED AERIAL VEHICLE FOR ACTING UPON A RESTRICTION IN SERVICES FOR THE UAV, A UAV CONTROL SERVER AND A BASE STATION

CROSS REFERENCE TO RELATED APPLICATION(S)

This application is a 35 U.S.C. § 371 National Phase Entry Application of PCT/EP2020/060859, filed Apr. 17, 2020, designating the United States, the disclosure of which is incorporated herein by reference in its entirety.

A method of and an unmanned aerial vehicle for acting upon a restriction in services for the UAV, a UAV control server and a base station.

TECHNICAL FIELD

The present disclosure generally relates to the field of telecommunications and, more specifically, to a method of, and an unmanned aerial vehicle for acting upon a restriction in services for the UAV, a UAV control server and a base station.

BACKGROUND

Nowadays, Unmanned Arial Vehicles, UAV's, also often denoted as drones, are becoming more and more popular and are being deployed for a variety of purposes. These types of UAVs may, for example, be used in aerial surveillance, commercial and motion picture filmmaking, promotional films, Search and Rescue (SAR) operations, video blogging, scientific research, inspection of buildings, etcetera. It may be foreseen that other types of unmanned vehicles, i.e. besides UAVs, may receive an increased amount of attention in the next couple of years, like self-driving cars, trains busses and/or boats.

The present disclosure is directed to UAVs that are capable of being connected to a telecommunication network. The UAVs may be connected to the telecommunication network just like regular User Equipment, UEs. That is, a UAV may have a cellular connection to a Radio Access Network, RAN, for connecting to the core network of the telecommunication network. The first node to which the UAV connects in the RAN is the base station. This could be a eNodeB in 4G telecommunication networks or a gNodeB in 5G telecommunication networks.

Just like regular UEs, it is foreseen that these UAVs have their own identity in the telecommunication network. As such, they may be provided with their own unique International Mobile subscriber Identity, IMSI. Another option is that a UAV is associated with a particular UE, and that it shares the IMSI of the UE when connecting to the telecommunication network.

The introduction of the UAVs has led to discussions with respect to telecommunication regulatory aspects. Operators of telecommunication networks, and many other types of businesses, have realized that it may be beneficial to differentiate the regular UE subscribers from UAVs. It was found that the services that are provided by a telecommunication network may not be applicable for each type of subscriber. Some subscribers, like UAVs, may be offered a different set of services compared to the set of services offered to other subscribers, like the more regular UEs.

SUMMARY

Currently, there are no mechanisms known, or in place, that accommodate the above described intention of limiting or restricting services used by the UAV from the network operator, based on cell level broadcasted network properties, before accessing this cell. Further, there are no mechanism known, or in place, that would lead a UAV to perform a particular action based on services provided by the telecommunication network for that particular UAV.

It would be advantageous to achieve a method of and an unmanned aerial vehicle for acting upon a restriction in services for the UAV, a UAV control server and a base station.

In a first aspect of the present disclosure, there is provided a method of acting upon a restriction in services for an unmanned aerial vehicle, UAV, wherein the UAV is connected to a telecommunication network and wherein the UAV is allowed to utilize one or more services within the telecommunication network. The method comprising the steps of:

- receiving, by the UAV, from a base station in the telecommunication network, access information for being served by the base station;
- determining, by the UAV, from the access information that at least one service of the one or more allowed services is restricted;
- determining, by the UAV, an action to be performed based on the at least one restricted service, the action being at least one of
  - a communication service modification of the UAV, and
  - a physical action of the UAV;
- performing, by the UAV, the action.

The present disclosure is directed to the concept that the telecommunication network may, at a certain point in time, decide to change one or more services for the UAV and that the UAV is able to translate the restricted service into an action that is to be performed by the UAV. This aspect is described in more detail here below.

In a first step, the UAV receives, from a base station in the telecommunication network, access information for being served by the base station.

The access information may, for example, be conveyed in an access information message. The access information message may, for example, be a Radio Resource Control, RRC, message. Such a message may be broadcasted by a base station to indicate to its users how it is configured. Another option is that the access information is broadcasted in a master information block and/or one or more system information blocks, i.e. SIB's. Each of the SIB's is directed to a particular aspect of the telecommunication system. The first SIB block, i.e. SIB 1, may, for example, be directed to Cell selection parameters and to the scheduling of other SIBs. The second SIB block, i.e. SIB 2, may, for example, be directed to the radio resource configuration. The specific parameters associated with any of the SIB's may be considered access information.

In any case, the access information comprised by the access information message, whether it is conveyed in a RRC message or via other types of messages, is directed to the services that are supported, or allowed, by the telecommunication network for a particular UE and thus also for a particular UAV.

Based on the received access information, the UAV determines, in a second step, that at least one service of the one or more allowed services is restricted.

The above described situation may, for example, occur during a handover, or cell reselection, wherein a UAV is handed over from a first base station to a second base station. The second base station may have a different set of services available for the UE compared to the first base station.

In a third step, the UAV determines an action to be performed based on the at least one restricted service, wherein the action is any of a communication service modification of the UAV and a physical action of the UAV and, in a fourth step, the UAV performs the determined action.

The UAV is thus able to translate the at least one restricted service to a particular action that is to be taken. In order to do so, the UAV may be equipped with a look up table, or anything alike, wherein particular actions are listed for each restricted service. Such a look up table may be predetermined, or may be updated during the lifetime of the UAV.

The above allows for flexibility. Assuring that the look up table may be amended, or updated, during the lifetime of the UAV allows for further development of, or amendments in, policies for UAV's even when particular UAV's have already been manufactured. Updated policies for a UAV may be converted into an updated look up table and the updated look up table may be uploaded into the UAV. The updated look up table may be uploaded via the telecommunication network connection associated with the UAV or via any other means available.

Following the above, the UAV may detect that a particular service is restricted, and may thus consult a look up table to see which actions are no longer allowed based on the restricted service or may see which actions are to be taken based on the restricted service, and may act accordingly.

In accordance with the present disclosure, the UAV detects that a particular service is restricted. This may encompass that a particular service is barred, i.e. no longer available for the UAV.

In an example, the step of determining comprises:

- forwarding, by the UAV, information on the at least one restricted service, via the telecommunication network, to a UAV control server;
- receiving, by the UAV, from the UAV control server, over the telecommunication network an instruction message comprising the action to be performed by the UAV.

This particular example describes the situation in which a UAV control server is responsible for determining the action that is to be performed. The advantage of this example is that translation aspects, i.e. determining from the barred service the action to be performed, is maintained centrally. This, thus, allows for a quick and relatively simple updating process as only the UAV control server is to be updated when a particular change in the translation aspect is to be implemented.

It is noted that the UAV control server may, or may not, be under the control of the telecommunication network provider. The UAV server may, for example, be under the control of air control authorities.

In a further example, the step of determining comprises:

- sending, by the UAV, via the telecommunication network, to a UAV control server, a request message thereby requesting the UAV control server approval for performing the determined action;
- receiving, by the UAV, via the telecommunication network, from the UAV control server, a response message thereby indicating an approval for performing the determined action.

This particular example is directed to the situation that the UAV actually determines the action that is to be performed, but requests the UAV control server approval for doing so.

In another example, the action is a communication service modification of the UAV, wherein the communication service modification is any of limited service with respect to a video bit rate of the UAV, only Radio Resource Control, RRC, and/or Non-access stratum, NAS, signalling is allowed, only UAV control related user plane is allowed, and/or limited bandwidth per bearer.

In another example, the action is a physical action of the UAV, wherein the physical action is any of landing of the UAV, emergency landing of the UAV, modify flying path of the UAV to an alternative path, set minimum and/or maximum altitude of the UAV, set minimum and/or maximum speed of the UAV, handover of the UAV from a first base station in the telecommunication network to a second base station in the telecommunication network.

In a second aspect of the present disclosure, there is provided a method for facilitating an unmanned aerial vehicle, UAV, to act upon a restriction in services, wherein the UAV is connected to a telecommunication network and wherein the UAV is allowed to utilize one or more services within the telecommunication network. The method comprising the step of:

- broadcasting, by a base station comprised in the telecommunication network, access information for being served by the base station, wherein the UAV is able to determine from the access information that at least one service of the one or more allowed services is restricted.

It is noted that the advantages and definitions as disclosed with respect to the embodiments of the first aspect of the invention also correspond to the embodiments of the second aspect of the invention, being the method of facilitating an unmanned aerial vehicle, UAV.

In a third aspect of the present disclosure, there is provided a method for facilitating an unmanned aerial vehicle, UAV, to act upon a restriction in services, wherein the UAV is connected to a telecommunication network and wherein the UAV is allowed to utilize one or more services within the telecommunication network. The method comprising the step of:

- receiving, by an UAV control server any of:
  - information on at least one restricted service for the UAV;
  - a request message thereby requesting the UAV control server approval for performing a particular action;
- transmitting, by the UAV control server any of:
  - an instruction message comprising an action to be performed by the UAV;
  - a response message thereby indicating an approval for performing the particular action;
- wherein the action being at least one of
- a communication service modification of the UAV, and
- a physical action of the UAV.

In a fourth aspect of the present disclosure, there is provided an unmanned aerial vehicle, UAV, arranged for acting upon a restriction in services, wherein the UAV is connected to a telecommunication network and wherein the UAV is allowed to utilize one or more services within the telecommunication network, the UAV comprising:

- a UAV communication module arranged for receiving, from a base station in the telecommunication network, access information for being served by the base station, and arranged for determining from the access information that at least one service of the one or more services is restricted;
- a UAV control module arranged for determining an action to be performed based on the at least one restricted service into an action, wherein the action is any of:
  - a communication service modification of the UAV, and
  - a physical action of the UAV;

and wherein the UAV is further arranged for performing the action.

In accordance with the present disclosure, the UAV may comprise two separate modules, being the UAV communication module and the UAV control module. The UAV communication module is responsible for communicating with the telecommunication network. The UAV control module is responsible for controlling the UAV. This allows for an effective implementation of the UAV.

This is advantageous as this allows for the use of existing hardware to be re-used. That is, the UAV communication module in the UAV may be based on existing hardware components just like those that are present in a more regular User Equipment, UE.

The UAV communication module is thus suitable for communicating with the telecommunication network, for example via a 5G New Radio, NR, or a Long Term Evolution, LTE, based Radio Access Network, RAN. The module may be based on existing chipsets that may also be present in smart phones, for example. This reduces the complexity of the UAV.

The control aspect of the UAV may be implemented in the UAV control module. This particular module may be tailored made, and may be arranged for translating the at least one barred service into an action that is to be performed. As mentioned before, this particular UAV control module may comprise a look up table for performing that particular step.

The UAV control module and/or the UAV communication module may, for example, be, or may comprise, a microcontroller or any other control device such as a microprocessor, a field programmable gate array, FPGA, or anything alike. The microcontroller may, for example, receive the relevant input signals at some of the available input pins and may be provide output control signals at other available output pins.

It is noted that the UAV control module and the UAV communication module are separated, and that a communication interface may be required between those modules. The interface may be standardized, or may be tailor made. A standardized communication interface may be preferred such that existing UAV communication modules may communicate with UAV control modules of different vendors.

Further, the UAV control module may comprise a memory for, for example, storing the look up table. The memory may be a Read Only Memory, ROM, Random Access Memory, RAM, a cache or anything alike.

In an example, the UAV control module is arranged for determining the action by:

- forwarding information on the at least one restricted service, via the telecommunication network, to a UAV control server;
- receiving from the UAV control server, over the telecommunication network an instruction message comprising the action to be performed by the UAV.

In a further example, the UAV control module is arranged for determining the action by:

- sending, via the telecommunication network, to a UAV control server, a request message thereby requesting the UAV control server approval for performing the determined action;
- receiving, via the telecommunication network, from the UAV control server, a response message thereby indicating an approval for performing the determined action.

In another example, the action is a communication service modification of the UAV, wherein the communication service modification is any of:

- limited service with respect to a video bit rate of the UAV;
- only Radio Resource Control, RRC, and/or Non-access stratum, NAS, signalling is allowed;
- only UAV control related user plane is allowed;
- limited bandwidth per bearer.

In a further example, the action is a physical action of the UAV, wherein the physical action is any of:

- landing of the UAV;
- emergency landing of the UAV;
- modify flying path of the UAV to an alternative path;
- set minimum and/or maximum altitude of the UAV;
- set minimum and/or maximum speed of the UAV;
- handover of the UAV from a first base station in the telecommunication network to a second base station in the telecommunication network.

In a further aspect of the present disclosure, there is provided a base station arranged to operate in a telecommunication network, and arranged for facilitating an unmanned aerial vehicle, UAV, to act upon a restriction or change in services, wherein the UAV is connected to the telecommunication network and wherein the UAV is allowed to utilize one or more services within the telecommunication network, the base station comprising:

- a transmitter arranged for broadcasting access information for being served by the base station, wherein the UAV is able to determine from the access information that at least one service of the one or more services is restricted, for example barred. The base station may thus operate in a telecommunication system, wherein the telecommunication system comprises the base station as well as the UAV in accordance with the present disclosure.

In another aspect, there is provided an unmanned aerial vehicle, UAV, control server arranged for facilitating an unmanned aerial vehicle, UAV, to act upon a restriction in services, wherein the UAV is connected to a telecommunication network and wherein the UAV is allowed to utilize one or more services within the telecommunication network, the UAV control server comprising:

- a receiver arranged for receiving any of:
  - information on at least one restricted service for the UAV;
  - a request message thereby requesting the UAV control server approval for performing a particular action;
- a transmitter arranged for transmitting any of:
  - an instruction message comprising an action to be performed by the UAV;
  - a response message thereby indicating an approval for performing the particular action;
- wherein the action being at least one of
- a communication service modification of the UAV, and
- a physical action of the UAV.

In yet another aspect, there is provided a computer program product comprising a computer readable medium having instructions stored thereon, which instructions cause the computer to implement a method in accordance with any of the method examples as provided above.

The above mentioned and other features and advantages of the disclosure will be best understood from the following description referring to the attached drawings. In the drawings, like reference numerals denote identical parts of parts performing an identical or comparable function or operation.

DETAILED DESCRIPTION

Embodiments contemplated by the present disclosure will now be described in more detail with reference to the accompanying drawings. The disclosed subject matter should not be construed as limited to the embodiments set forth herein. Rather, the illustrated embodiments are provided by way of example to convey the scope of the subject matter to those skilled in the art.

Figure 1:
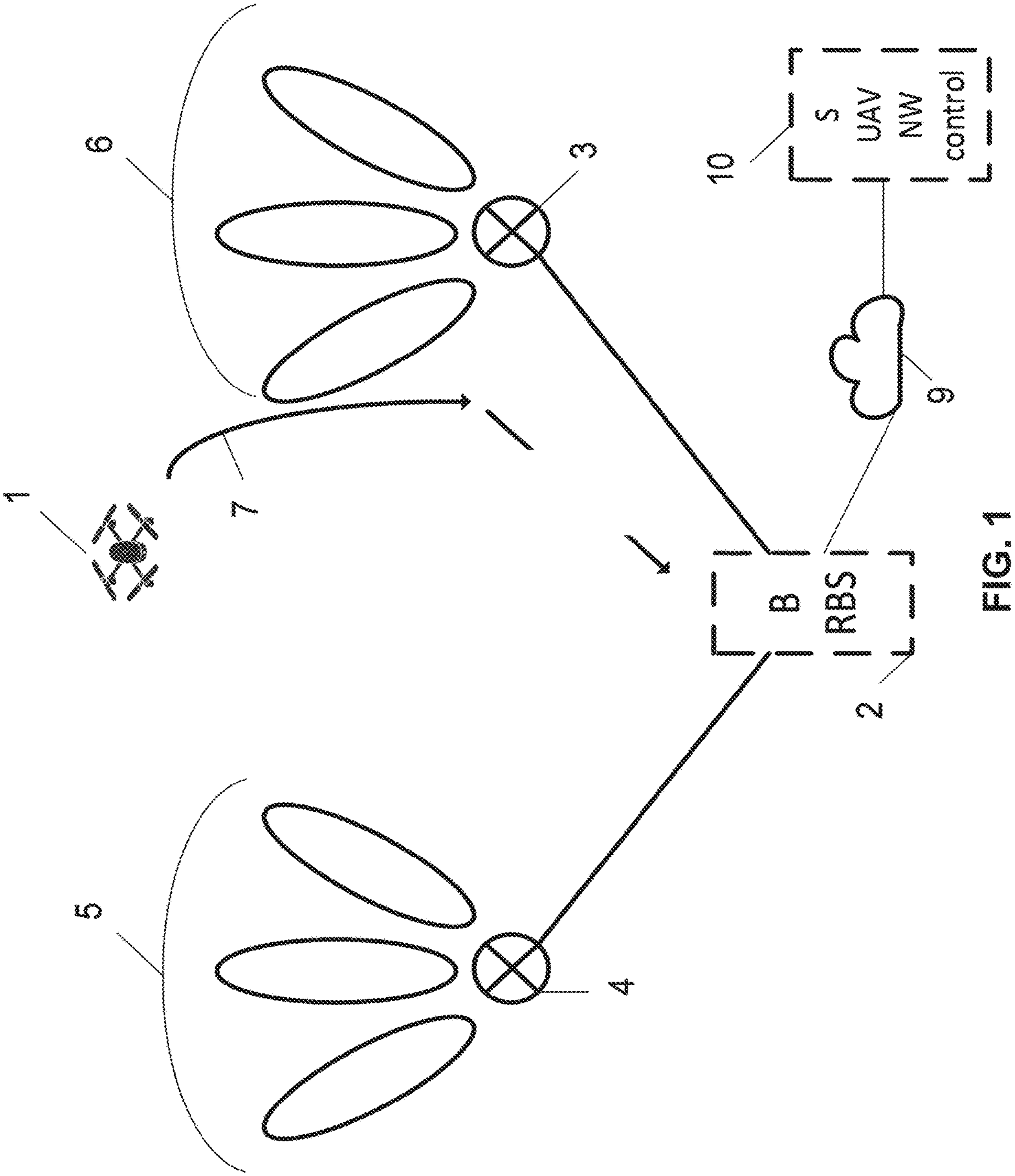
FIG. 1 schematically illustrates an Unmanned Aerial Vehicle, UAV, approaching an area broadcasting that the corresponding cell is barred for UAV's.

FIG. 1 schematically illustrates an Unmanned Aerial Vehicle, UAV, 1 approaching an area broadcasting that the corresponding cell is barred for UAV's 1.

The scenario depicted in FIG. 1 is explained with respect to the concept that cellular networks allow access limitation or restriction using broadcast information within a cell for a specific UAV 1.

In the prior art, there are no mechanisms available to limit or to restrict services used by the UAV 1 from the network operator, based on cell level broadcasted network properties, before accessing the corresponding cell.

Depending on operator policies, deployment scenarios, subscriber profiles, and available services, different criteria may be available for determining if network access for a UAV should be allowed, limited or blocked. These criteria may be understood, evaluated and interpreted for execution by the UAV 1.

Scenarios like natural disasters, accidents, etc., might require UAV's to take independent actions based on cellular network radio interactions like not entering a geographical cell area, block real time video surveillance or limiting valuable resources in the telecommunication network.

The present disclosure provides for a method for UAV's to take early corrective actions when flying into dynamically created restricted areas not known to the flight controller. This method may provide a mechanism to take actions before entering the specific radio cell geographical coverage or radio cell layer. Communication between internal UAV communication and control system may be required as UAV's may not be 3GPP standard compliant devices like UE's, but the installation of embedded communication modules may become more and more popular for flying beyond a visual line of sight.

FIG. 1 shows an UAV 1 approaching an area 6 broadcasting that the cell is barred for UAV's in the radio network. This could be, for example, an area covering a particular sporting event like the Olympics.

The telecommunication network comprises a Radio Access Network, RAN, and a core network. The RAN is used for connecting to the core network. In this particular case, the RAN consists of a radio base station 2 which is connected to two base station antenna's 3, 4. Each of the two base station antenna's has a particular radiation pattern as indicated with reference numerals 5 and 6.

The RAN connects to the core network which is visually depicted by the cloud pictogram 9. A UAV control server 10 is connected to the core network 9. The UAV control server 10 may reside in the telecommunication network or may reside in a public communication network, like the internet. In the latter, the UAV control server 10 may connect to a Packet Gateway of the telecommunication network.

The UAV 1 may receive 7 from the base station 2 an access information message comprising access information for being served by the base station 2. This aspect is described in more detail with respect to FIG. 2.

It is noted that the examples shown in the figures relate to services that are barred from a UAV. It is however possible, in accordance with the present invention, that a particular service is not barred but is restricted. The service may thus still be available for the UAV but in a modified form.

Figure 2:
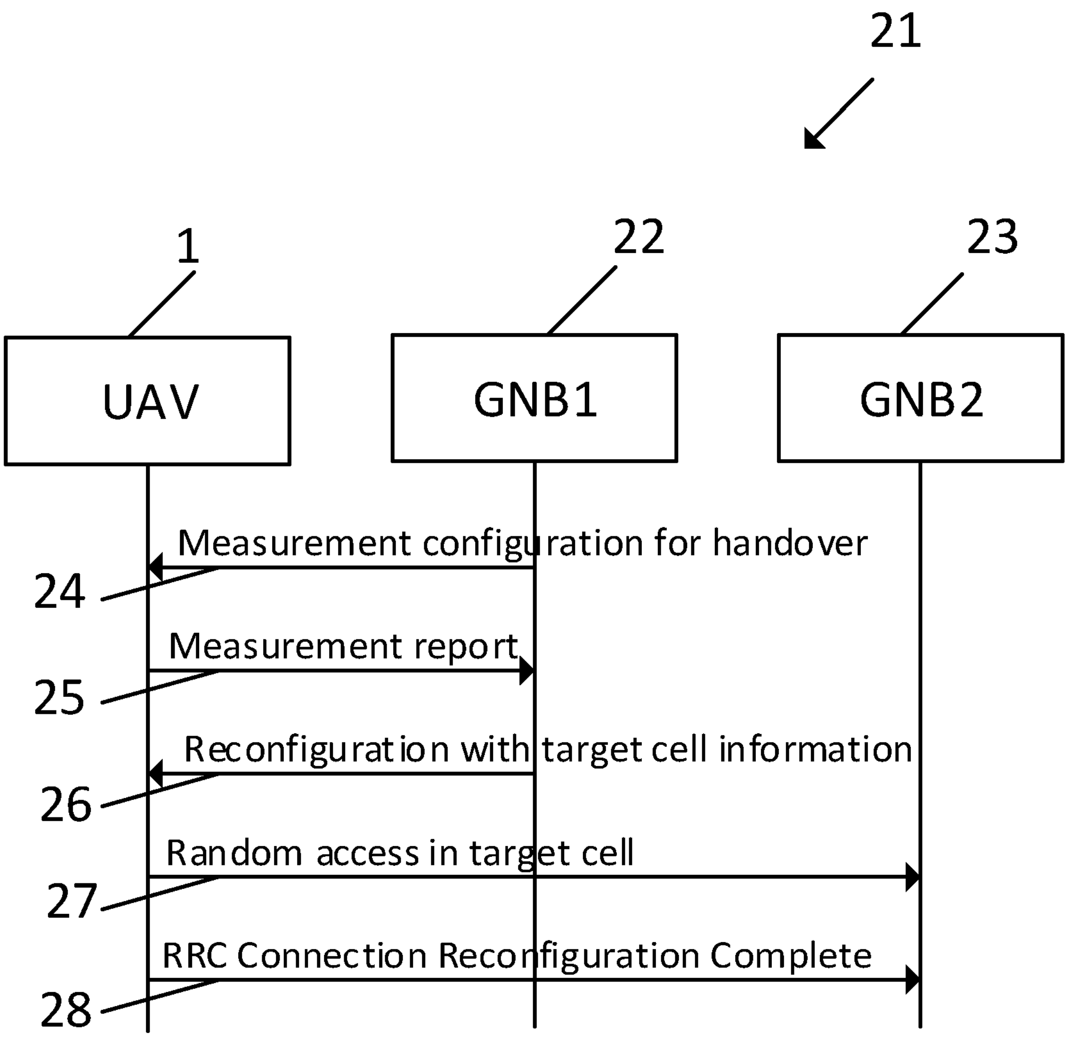
FIG. 2 schematically illustrates a flow chart for a handover of a UAV between two base stations.

FIG. 2 schematically illustrates a flow chart 21 for a handover of a UAV 1 between two base stations 22, 23.

As mentioned before, a handover may be a scenario in which the services for a particular UAV tend to change. However, other scenarios in which the services for a particular UAV change are also encompassed by the present disclosure.

The handover is initiated by a base station, i.e. the gNodeB1 22, in that the gNodeB1 22 requests 24 the UAV for measurement configuration for the handover.

To this end, the UAV 1 may have an RRC connection established with the gNodeB1 22, and the gNodeB1 22 may inform the UAV 1 in which event any received signal strength should be reported, by sending a configuration message, RRC Connection Reconfiguration message 24. The UAV 1 may keep track of the received signal strength of both its serving and neighbour gNodeB's, i.e. the gNodeB's having reference numerals 22 and 23. Then when one of the events specified occurs, the UAV 1 may report the received signal strength to its gNodeB1 22 through a Measurement Report message 25.

The gNodeB1 22, upon receipt of the message, may decide whether to initiate a handover or not by reviewing the reported strength information and by reviewing, for example, the overload status of the gNodeB2 23. Once decided, the gNodeB1 22 initiates handover of the UAV 1 to the gNodeB2 23.

The above described request 24 may be an RRC Connection reconfiguration request. Such a request comprises a trigger event, a report interval and a neighbour cell list. The trigger event specifies the trigger for the UAV 1 to send a measurement report and is, often, related to received signal strengths. The report interval may specify how often the measurement report should be reported by the UAV 1. The neighbour cell list may specify to which gNodeB's the measurement report should be tailored.

The above described measurement report 25 may, for example, comprise the signal strength associated with the gNodeB1 22 as well as the received signal strength associated with the gNodeB2 23.

It is noted that signalling between the different gNodeBs 22, 23 may occur, but is omitted from FIG. 2 for efficiency reasons.

Once the gNodeB1 22 has decided to handover the UAV 1 to the gNodeB2 23, the gNodeB1 22 will sent a RRC connection re-configuration message 26 to the UAV 1 containing the access information related to the gNodeB2 23. Next, the UAV 1 is to perform random access in the target cell, i.e. associated with gNodeB2 23 and, once completed, the UAV 1 sends an RRC Connection Reconfiguration Complete message 28.

The access information may be related to one or more System Information Blocks, SIBs, for example SIB1 of SIB2, in case of a 4G telecommunication network. SIB1 describes aspects relating to the granting and restricting of cell access and/or defines scheduling of other SIBs. SIB2 describes aspects relating to radio resource configuration information common for all equipment connected to the telecommunication network.

It is noted that the access information with respect to gNodeB2 23 may differ from the access information with respect to gNodeB1 22. That is, the UAV is to determine from the access information that at least one service of the one or more allowed services is barred.

The barred service is then translated into an action that is to be performed by the UAV 1. The action may, for example, be that the UAV 1 initiates a landing or modifies its flying path to an alternative path, or that it sets a minimum or a maximum altitude or speed, etc.

Figure 3:
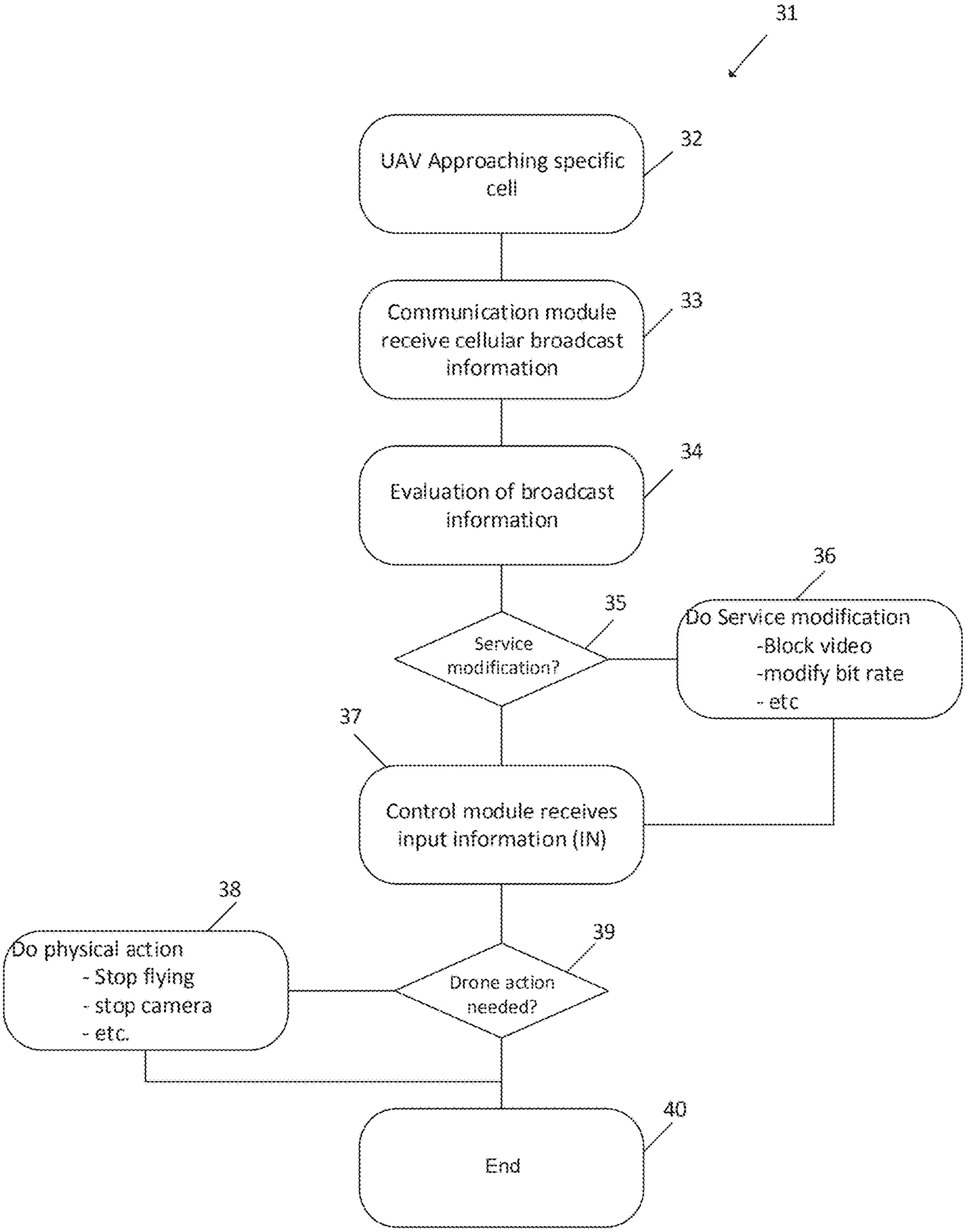
FIG. 3 schematically illustrates a flow chart comprising interactions between the UAV communication module and the UAV control module.

FIG. 3 schematically illustrates a flow chart 31 comprising interactions between the UAV communication module and the UAV control module.

In this particular example, it is assumed that the UAV 1 comprises a UAV communication module and a UAV control module. The UAV communication module may refer to a modem embedded in the UAV, may be 3GPP standard compliant and may be able to connect to the telecommunication network through the air interface. This module may be in charge for receiving the access information regarding the particular conditions of the access of the UAV to the corresponding cell. It is noted that the UAV communication module may be based on off-the-shelf equipment, like the equipment that is present in smart phones all over the world.

The UAV communication module may thus comprise the same, or similar, technology as is present in smart phones all over the world. The UAV communication module is able to facilitate 4G or 5G telecommunication signalling. The UAV control module may refer to the system present in the UAV that processes the input from the UAV communication module and, in some cases, from the UAV control server. This UAV communication module may translate the cellular network system information, i.e. the one or more services that are barred, and may steer physical elements of the UAV to modify the behaviour of the UAV accordingly.

The UAV control module may thus be arranged to understand the parameters that are utilized in the telecommunication network, and that are provided to the UAV control module by the UAV communication module.

The UAV control module may be a physically separate control block, for example a micro controller or a Field Programmable Gate Array, FPGA, or anything alike.

FIG. 3 concerns the situation in which the UAV is controlled by a telecommunication network. That is, the UAV is either using network services already or is about to use network services.

Here, the UAV approaches 32 a specific radio cell wherein the conditions of the radio cell vary from the one to which the UAV is currently connected. The UAV then needs to determine whether physical actions are required. This is initiated in that the UAV communication module receives 33 cellular broadcast information, i.e. the access information as discussed above.

The UAV communication module and/or the UAV control module may process and evaluate 34 the broadcast information based on radio domain tags. This type of information may include Identity of the UAV and categories for the access, i.e. service needs.

After the communication service modification evaluation, and the decision 35 that the service is to be modified, the UAV continues in actually performing the communication service modification. This could be related to the blocking of video, modifying of bit rate of video of the UAV, etc. The above is controlled 37 by the control module.

The action that is to be performed may also require a physical, i.e. UAV, action as indicated with reference numeral 39. If so, the control module may perform a physical action 38 of the UAV. For example, the control module may decide to stop flying and do an emergency landing, may decide to turn around and fly the other way, or anything alike. Then, the flow charts ends as indicated with reference numeral 40.

Figure 4:
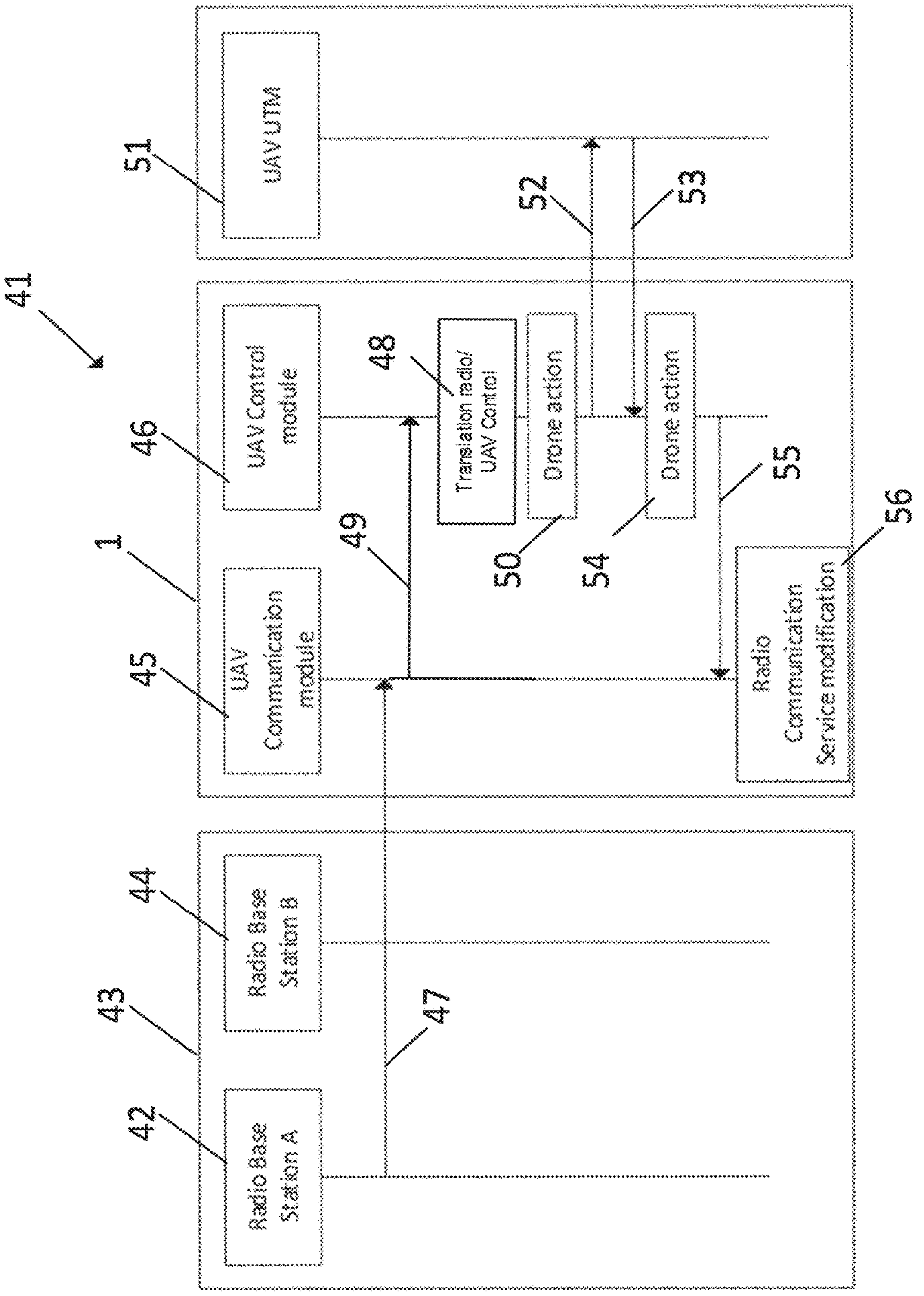
FIG. 4 schematically illustrates a flow chart comprising a message flow between the telecommunication network and the UAV.

FIG. 4 schematically illustrates a flow chart 41 comprising a message flow between the telecommunication network and the UAV.

One of the aspects of the present disclosure is that the UAV comprises logic to translate radio specific channel information, i.e. the access information, received by a 3GPP compliant mobile chipset into particular physical actions that are to be performed by the UAV, for example into UAV control actions. Different criteria for access control may be broadcasted over the radio access network and may be received by the UAV communication module.

Based on the retrieved information and evaluation of barred or restrictive services, a mapping may follow and may allow for translating the retrieved information into corresponding physical actions which may be accomplished by control signalling by the UAV control module.

FIG. 4 schematically illustrates a complete end-to-end signal flow in the scenario of a UAV 1 which is connected to radio cell A 42, in the Radio Access Network 43, but gets updated system information about limited service availability.

In this particular case, the UAV 1 stays connected to radio cell A 42, i.e. it is not handed over to radio cell B 44, and accepts the service provisioning is limited taking immediate action.

In a first step, the radio base state A 42 broadcasts information, more specifically access information, which is being received 47 by the UAV 1, more specifically the UAV communication module 45.

The UAV communication module 45 may be a 3GPP compliant module, like the one that is present in mobile phones or the like. The UAV communication module may be arranged to support 3G and/or 4G and/or 5G telecommunications.

The UAV communication module 45 may be arranged for determining, from the received access information, that at least one service is barred for the UAV 1. This is notified 49 to the UAV control module 46.

Based on the received notification 49, the UAV control module 46 is arranged to determine an action 50 to be performed based on the at least one barred service. The table below represent a table mapping that may be used by the UAV control module 46 for performing such a translation.

TABLE 1

| UAV Category | Access Category | UAV Communication module | UAV Control module |
|---|---|---|---|
| A | 1 | Cell allowed | No action |
| | 2 | Limited bandwidth per bearer | No action |

TABLE 1-continued

| UAV Category | Access Category | UAV Communication module | UAV Control module |
|---|---|---|---|
| B | 1 | Cell not allowed | Check with UTM |
| | 2 | Limited to NAS only | No action |
| | 3 | Communication service modification A | No action |
| C | 1 | Cell not allowed | Check with UTM |
| | 2 | Communication service modification A | No action |
| | 3 | Communication service modification B | No action |
| | 4 | No action | Cell speed limit |
| | 5 | No action | Cell minimum altitude |

As shown above, each UAV may be categorized into a particular category. Here, three categories are shown as indicated with the numbers "A", "B" and "C". For each UAV category, multiple access categories may exist. Each access category is coupled to a particular requirement that is associated with the UAV, for example "cell allowed", "limited bandwidth per bearer", "cell not allowed", etc. The particular requirement may thus be deduced, or retrieved, from the access information that is broadcasted by the radio base station A 42.

The UAV control module 46 may thus utilize the table above to translate the requirement into a particular action that is to be performed by the UAV.

For example, the requirement "cell not allowed" may be translated into a "check with UTM" to see what kind of actions are required by the UAV.

It is noted that the UAV category may depend on regulator classification based on specific parameters such as weight, size, maximum altitude allowed, etc. Each UAV category may be associated with one or several access categories which may trigger one or more actions in the UAV control module.

The table as indicated above may be interpreted in that category A is assigned to police UAVs which are still allowed to access a particular cell with a complete service package or may be offered a maximum of only limited services.

Category B may, for example, be assigned to commercially flying UAVs, whereas category C may, for example, be assigned to UAVs for consumers.

In a nutshell, the information broadcasted is received by the UAV communication module. The information is then translated, by the UAV control module, into a particular action that is to be performed.

In this particular case, the UAV control module 46 forwards 52 information on the at least one barred service, via the telecommunication network to a UAV control server 51, which is indicated with the wording "UAV UTM". The UAV control server 51 is then arranged to actually determine the action that is to be performed by the UAV, and communicate 53 the action that is to be performed by the UAV back to the UAV over the telecommunication network.

The UAV then performs 54 the action that is specified by the UAV control server 51, and the action is also communicated 55 back to the UAV control server. Such communication may be necessary if the action is related to a particular action that is to be performed by the UAV communication module 45. For example, the UAV control module 46 may decide to perform a handover of the UAV to a different base station, for example base station B 44. The UAV communication module 45 may then perform a radio communication service modification 56.

Figure 5:
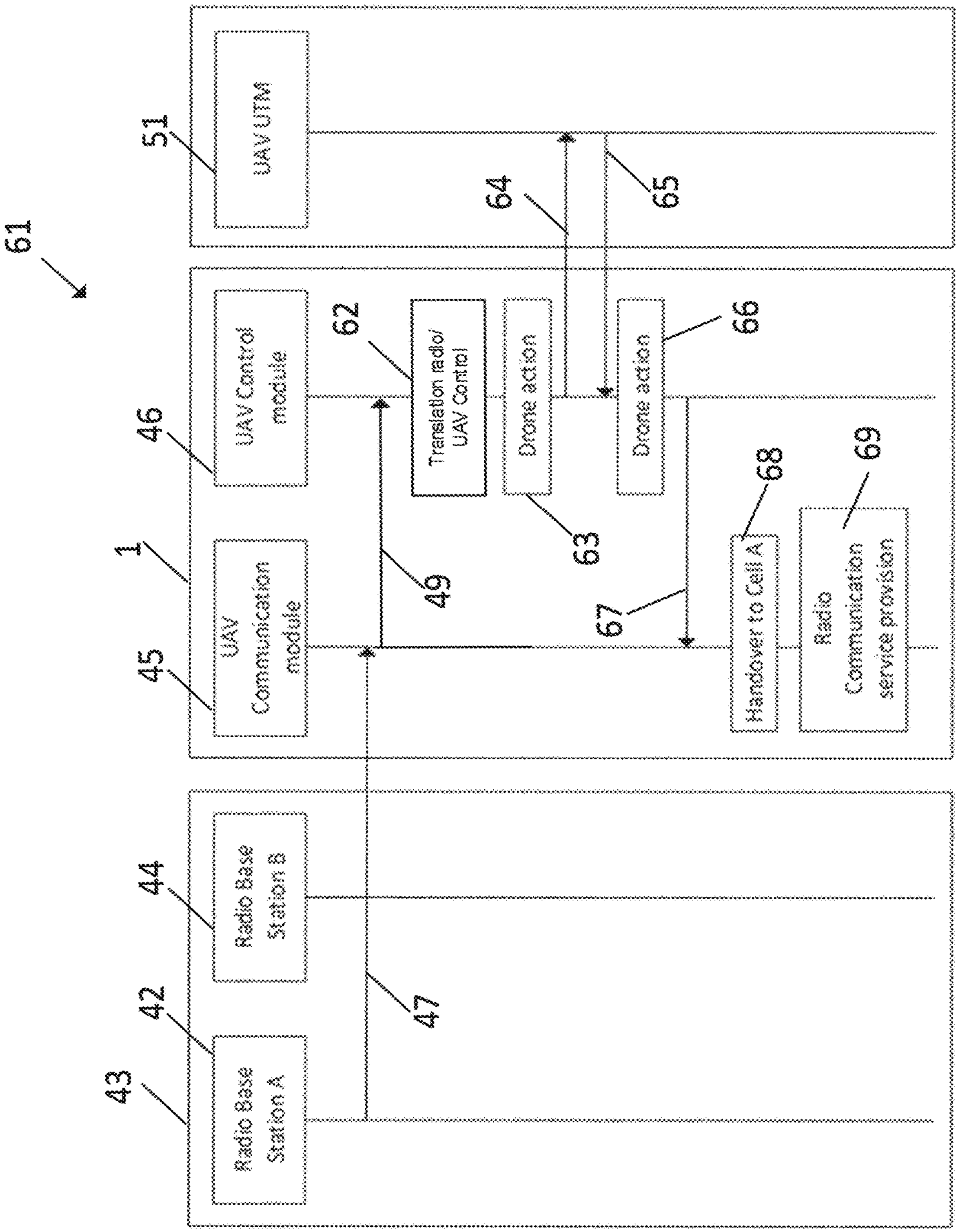
FIG. 5 schematically illustrates another flow chart comprising a message flow between the telecommunication network and the UAV.

FIG. 5 schematically illustrates a flow chart 61 comprising a message flow between the telecommunication network and the UAV. It is noted that the same reference numerals are used in comparison with FIG. 4 for the same elements or the same aspects.

The main difference with respect to FIG. 4 is that, in this particular scenario, the UAV 1 is connected to the radio base station B 44 and that it receives the broadcasted information, i.e. the access information, from the radio bases station A 42.

Based on the access information received from the radio base station A 42, the UAV control module 46 may decide that at least one service is barred. This may mean that the UAV may come to the conclusion that at least one service is barred for the UAV when comparing the available services to the UAV when connected to the radio base station A 41 with the available services to the UAV when connected to the radio base station B 44. It is noted that this could go two ways. The list of services available for the UAV, when connected to the radio base station A 42, may be longer, or shorter, compared to the list of services available for the UAV, when connected to the radio base station A 44.

The feature that the UAV 1 determines from the access information that at least one service of the one or more allowed services is barred may thus also include the situation that the UAV 1 currently has one or more services barred compared to the situation when it is connected to another base station.

In this particular case, the UAV control module 46 translates 62, from the access information, that at least one service of the one or more allowed services is barred. The UAV control module 46 then performs 63 an action in that it decides to handover the UAV 1 from radio base station B 44 to radio base station A 42. This decision is communicated to the UAV UTM 51, and an acknowledgement is received 65 from the UAV UTM 51.

The action is then initiated 66 and communicated 67 to the UAV communication module 45. The UAV communication module 45 performs the handover of the UAV 1 to cell A and regular radio communication service provisions 69 may be initiated.

Figure 6:
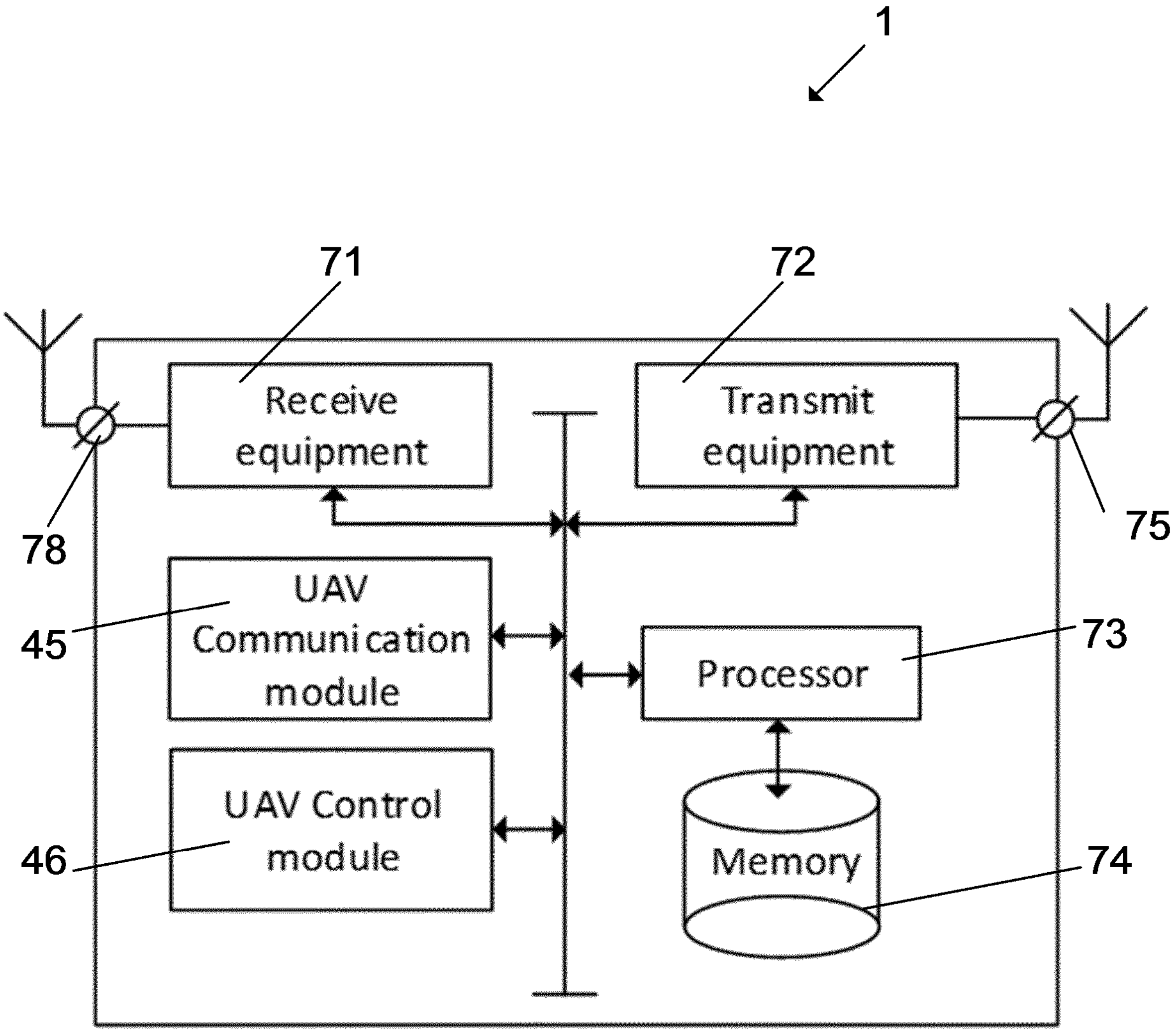
FIG. 6 schematically illustrates an Unmanned Aerial Vehicle, UAV, in accordance with the present disclosure.

FIG. 6 schematically illustrates an Unmanned Aerial Vehicle, UAV, 1 in accordance with the present disclosure.

The unmanned aerial vehicle, UAV, 1 is arranged for acting upon a restriction in services, wherein the UAV 1 is connected to a telecommunication network and wherein the UAV 1 is allowed to utilize one or more services within the telecommunication network.

The UAV comprising:

a UAV communication module 45 arranged for receiving, from a base station in the telecommunication network, an access information message comprising access information for being served by the base station, and arranged for determining from the access information that at least one service of the one or more services is barred;

a UAV control module 46 arranged for determining an action to be performed based on the at least one barred service into an act, wherein the action is any of:

a communication service modification of the UAV, and a physical action of the UAV;

and wherein the UAV 1 is further arranged for performing the action.

Incoming packets are received via the input terminal 78 and the receive equipment 71. Outgoing packets are provided via the transmit equipment 72 and the output terminal 75.

The UAV 1 further comprises a processor 73, connected to a memory 74, and wherein the receive equipment 71, the transmit equipment 72, the UAV communication module 45, the UAV control module 46 are all connected to the processor 73 via a bus. The processor 73 is connected to a memory 74 for temporal storage of data.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not construed as limiting scope thereof.

The invention claimed is:

1. A method of acting upon a restriction in services for an unmanned aerial vehicle, UAV, wherein the UAV is connected to a telecommunication network and wherein the UAV is allowed to utilize one or more services within the telecommunication network, the method comprising the steps of:

receiving, by the UAV, from a base station in the telecommunication network, access information for being served by the base station;

determining, by the UAV, from the access information that at least one service of the one or more allowed services is restricted;

accessing, by the UAV, from a look up table a current listing of actions that can be performed for the restricted service, wherein the look up table is adapted to be updated as the actions that can be performed for the restricted service changes with an updated listing of actions that can be performed for the restricted service;

determining, by the UAV, an action from the listing of actions to be performed, the action being a physical action of the UAV.

2. The method in accordance with claim 1, wherein the step of determining comprises:

forwarding, by the UAV, information on the at least one restricted service, via the telecommunication network, to a UAV control server;

receiving, by the UAV, from the UAV control server, over the telecommunication network an instruction message comprising the action to be performed by the UAV.

3. The method in accordance with claim 1, wherein the step of determining comprises:

sending, by the UAV, via the telecommunication network, to a UAV control server, a request message requesting the UAV control server approval for performing the determined action; and receiving, by the UAV, via the telecommunication network, from the UAV control server, a response message indicating an approval for performing the determined action.

4. The method in accordance with claim 1, wherein the physical action is any of:

landing of the UAV;

emergency landing of the UAV;

modify flying path of the UAV to an alternative path;

set minimum and/or maximum altitude of the UAV;

set minimum and/or maximum speed of the UAV; and/or handover of the UAV from a first base station in the telecommunication network to a second base station in the telecommunication network.

5. The method in accordance with claim 1, wherein the access information is comprised by a System Information Block, SIB.

6. A method for facilitating an unmanned aerial vehicle, UAV, to act upon a restriction in services, wherein the UAV is connected to a telecommunication network and wherein the UAV is allowed to utilize one or more services within the telecommunication network, the method comprising the step of:

broadcasting, by a base station comprised in the telecommunication network, access information for being served by the base station, wherein the UAV is able to determine from the access information that at least one service of the one or more allowed services is restricted, wherein the one service is a physical action of the UAV, wherein the access information broadcast to the UAV includes a look up table including a current listing of actions that can be performed for the restricted service, wherein the look up table is adapted to be updated as the actions that can be performed for the restricted service changes with an updated listing of actions that can be performed for the restricted service.

7. A method for facilitating an unmanned aerial vehicle, UAV, to act upon a restriction in services, wherein the UAV is connected to a telecommunication network and wherein the UAV is allowed to utilize one or more services within the telecommunication network, the method comprising the steps of:

receiving, by an UAV control server, any of:

information on at least one restricted service for the UAV; and/or a request message requesting the UAV control server approval for performing a particular action;

transmitting, by the UAV control server, any of:

an instruction message comprising an action to be performed by the UAV; and/or a response message indicating an approval for performing the particular action;

wherein the action is a physical action of the UAV, wherein the UAV control server further transmitting a look up table including a current listing of actions that can be performed for the restricted service, wherein the look up table is adapted to be updated as the actions that can be performed for the restricted service changes with an updated listing of actions that can be performed for the restricted service.

8. An unmanned aerial vehicle, UAV, arranged for acting upon a restriction in services, wherein the UAV is connected to a telecommunication network and wherein the UAV is allowed to utilize one or more services within the telecommunication network, the UAV comprising:

a UAV communication module arranged for receiving, from a base station in the telecommunication network, access information for being served by the base station, and arranged for determining from the access information that at least one service of the one or more services is restricted;

the UAV control module further arranged for accessing from a look up table a current listing of actions that can be performed for the restricted service, wherein the look up table is adapted to be updated as the actions that can be performed for the restricted service changes with an updated listing of actions that can be performed for the restricted service the UAV control module further arranged for determining an action from the listing of actions to be performed, wherein the action is a physical action of the UAV;

and wherein the UAV is further arranged for performing the action.

9. The UAV in accordance with claim 8, wherein the UAV control module is arranged for determining the action by:

forwarding information on the at least one restricted service, via the telecommunication network, to a UAV control server; and receiving from the UAV control server, over the telecommunication network an instruction message comprising the action to be performed by the UAV.

10. The UAV in accordance with claim 8, wherein the UAV control module is arranged for determining the action by:

sending, via the telecommunication network, to a UAV control server, a request message requesting the UAV control server approval for performing the determined action; and receiving, via the telecommunication network, from the UAV control server, a response message indicating an approval for performing the determined action.

11. The UAV in accordance with claim 8, wherein the physical action is any of:

landing of the UAV;

emergency landing of the UAV;

modify flying path of the UAV to an alternative path;

set minimum and/or maximum altitude of the UAV;

set minimum and/or maximum speed of the UAV; and/or handover of the UAV from a first base station in the telecommunication network to a second base station in the telecommunication network.

12. The UAV in accordance with claim 8, wherein the access information is comprised by a System Information Block, SIB.

13. A base station arranged to operate in a telecommunication network, and arranged for facilitating an unmanned aerial vehicle, UAV, to act upon a restriction in services, wherein the UAV is connected to the telecommunication network and wherein the UAV is allowed to utilize one or more services within the telecommunication network, the base station comprising:

a transmitter arranged for broadcasting access information for being served by the base station, wherein the UAV is able to determine from the access information that at least one service of the one or more services is restricted, wherein the one service is a physical action of the UAV, wherein the access information broadcast to the UAV includes a look up table including a current listing of actions that can be performed for the restricted service, wherein the look up table is adapted to be updated as the actions that can be performed for the restricted service changes with an updated listing of actions that can be performed for the restricted service.

14. An unmanned aerial vehicle, UAV, control server arranged for facilitating an unmanned aerial vehicle, UAV, to act upon a restriction in services, wherein the UAV is connected to a telecommunication network and wherein the UAV is allowed to utilize one or more services within the telecommunication network, the UAV control server comprising:

a receiver arranged for receiving any of:

information on at least one restricted service for the UAV; and/or a request message requesting the UAV control server approval for performing a particular action; and a transmitter arranged for transmitting any of:

an instruction message comprising an action to be performed by the UAV; and/or a response message indicating an approval for performing the particular action;

wherein the action being a physical action of the UAV, wherein the transmitter is further arranged for transmitting a look up table including a current listing of actions that can be performed for the restricted service, wherein the look up table is adapted to be updated as the actions that can be performed for the restricted service changes with an updated listing of actions that can be performed for the restricted service.

15. A computer program product comprising a non-transitory computer readable medium storing a computer program comprising instructions, which, when executed on at least one processor, cause the at least one processor to implement a method in accordance with claim 1.

* * * * *